United States Patent [19]

Kablaoui et al.

[11] 3,895,071
[45] July 15, 1975

[54] SEPARATION OF NITROKETONE FROM A CRUDE NITROOXIDATION REACTION PRODUCT

[75] Inventors: Mahmoud S. Kablaoui, Wappingers Falls; Richard F. Love, Fishkill, both of N.Y.

[73] Assignee: Texaco Inc., New York, N.Y.

[22] Filed: Jan. 30, 1974

[21] Appl. No.: 438,134

Related U.S. Application Data

[63] Continuation-in-part of Ser. No. 244,522, April 17, 1972, abandoned.

[52] U.S. Cl.......... 260/586 R; 260/590; 260/593 R; 260/597 R; 423/396
[51] Int. Cl.²......................................... C07C 45/24
[58] Field of Search............ 260/586 R, 586 A, 590, 260/593 R, 597 R

[56] References Cited
UNITED STATES PATENTS 3,637,839    1/1972    Tanaka et al.................. 260/586 R
3,657,349    4/1972    Lachowicz et al.............. 260/586 R

*Primary Examiner*—Leon Zitver
*Assistant Examiner*—Norman Morgenstern
*Attorney, Agent, or Firm*—T. H. Whaley; C. G. Ries; George J. Darsa

[57] ABSTRACT

Method for the purification of nitroketones from crude mixtures containing, in addition to the nitroketone, nitronitrates, nitroalcohols, denitrating agent and nitric acid, wherein the crude mixture is initially treated with ammonia thereby forming and separating the ammonium salt of the nitroketone and ammonium nitrate from the crude mixture, contacting the ammonium nitrate and ammonium salt of the nitroketone with a liquid hydrocarbon at a temperature sufficient to decompose the ammonium salt of the nitroketone to ammonia and said nitroketone, separating ammonia and ammonium nitrate from the hydrocarbon and nitroketone and separating the nitroketone from the hydrocarbon.

14 Claims, No Drawings

SEPARATION OF NITROKETONE FROM A CRUDE NITROOXIDATION REACTION PRODUCT

CROSS REFERENCE TO RELATED APPLICATION

This application is a continuation-in-part of our copending application Ser. No. 244,522, filed Apr. 17, 1972 now abandoned.

BACKGROUND OF THE INVENTION

This invention relates to a process for the separation and recovery of nitroketones from crude mixtures containing the same. More particularly, this invention relates to the separation and recovery of nitroketones in high purity from crude mixtures containing nitronitrates, nitroalcohols, denitrating agent and nitric acid.

The preparation of nitroketones has been described in U.S. Pat. Nos. 3,466,326 and 3,557,166 assigned to Texaco Inc. Specifically, nitroketones have been prepared from olefins or cycloalkenes by simultaneously contacting an olefin or cycloalkene with a mixture of dinitrogen tetroxide and oxygen to form a nitroalkylperoxy nitrate or a nitrocycloalkylperoxy nitrate. Subsequent contacting of the nitroalkylperoxy nitrate or nitrocycloalkylperoxy nitrate with a denitrating agent illustrated by

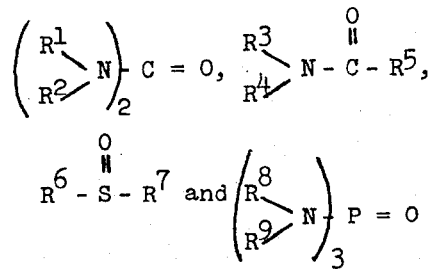

where $R^1$, $R^2$, $R^6$, $R^7$, $R^8$ and $R^9$ are alkyl of from 1 to 5 carbons and $R^3$, $R^4$ and $R^5$ are hydrogen or alkyl of from 1 to 5 carbons, such as dimethylformamide, diethylformamide, dimethylacetamide, dimethylsulfoxide, diethylsulfoxide, tetramethylurea, tetraethylurea or hexamethylenephosphoramide forms the nitroketone. Separation and recovery of the nitroketone was thereafter undertaken by quenching the reaction mixture in water after removal of solvent and recovering the nitroketone by filtration. Alternatively, the nitroketone could be recovered by distillation. These earlier procedures however suffered from a number of disadvantages not the least of which included contamination of the nitroketone with the denitrating agent and byproducts such as nitronitrates and nitroalcohols. Moreover, where mixtures of olefins or cycloalkenes, such as $C_6$ to $C_{14}$ olefins, were nitrooxidized and denitrated to a mixture of nitroketones, substantially pure nitroketones could not be readily recovered from the crude reaction mixture due to their wide range of solubilites and boiling points. Further, to recover the decomposing agent and conventional reaction diluent for reuse and additionally the nitronitrate and nitroalcohol byproducts became a task not easily accomplished and certainly economically unattractive.

It is therefore an objection of this invention to provide a new process for the recovery and separation of nitroketones.

Another object of this invention is to provide a process wherein nitroketones can be separated in high purity from crude mixtures containing the same.

Yet another object of this invention is to provide a process wherein solvent and decomposing agent can be easily recovered from crude nitrooxidation alkene or cycloalkene mixtures in good yields.

Other objects and advantages will become apparent from a reading of the following detailed description and examples.

SUMMARY OF THE INVENTION

Broadly, this invention contemplates a process for the separation and recovery of a nitroketone from a crude composition containing said nitroketone and nitric acid, denitrating agent, nitronitrate and nitroalcohol which comprises:

a. treating said crude composition with from about 2 to 10, preferably 2 to 2.5, moles of ammonia per mole of nitroketone at a temperature of from about −10° to 30°C., preferably 0° to 10°C., thereby forming an ammonium salt of said nitroketone and ammonium nitrate, b. separating the ammonium salt of said nitroketone and ammonium nitrate from (a), c. contacting the ammonium salt of said nitroketone and ammonium nitrate with a liquid hydrocarbon at a temperature of from about 35° to 100°C., preferably 50° to 80°C., and separating ammonium nitrate and ammonia vapors from said liquid hydrocarbon, and d. separating said nitroketone from said hydrocarbon of (c).

The crude composition and particularly the nitroketone portion thereof subsequently separated and recovered according to this invention is derived from an alkene, including olefins and cycloalkenes, corresponding to the formula:

$$R - CH = CH - R'$$

where R is an alkyl group having from 1 to 20 carbon atoms or aryl group having from 6 to 20 carbon atoms and where R' is hydrogen, an alkyl group having from 1 to 20 carbon atoms or an aryl group having from 6 to 20 carbon atoms or where R and R' together form a polymethylene group of 1 to 20, preferably 4 to 20 carbon atoms. A combination of groups may be present as for example R may be alkyl and R' aryl. Illustrative of the alkenes we mention propylene, 1-butene, 2-pentene, cyclopentene, 3-methylcyclopentene, 3-hexene, cyclohexene, 2-heptene, cycloheptene, 4-methylcyclohexene, 4-phenylcyclohexene, 1-octene, cyclooctene, beta-methylstyrene, 1-decene, cyclodecene, 2-dodecene, cyclodecene, diphenylethylene, 4-tetradecene, dibenzylethylene, 7-heptadecene, cyclooctadecene, cycloeicosene and 10-eicosene. Mixtures of alkenes such as 3-decene and 4-decene, 4-dodecene and 5-dodecene, mixtures of internal tetradecenes, or mixtures of $C_6$ to $C_{14}$ or $C_{10}$ to $C_{14}$ or $C_{14}$ to $C_{18}$ alkenes are similarly contemplated. The alkene described above is contacted in a first stage with a mixture of dinitrogen tetroxide and oxygen to form a nitroperoxy intermediate of the general formula:

$$\begin{array}{c} OONO_2 \\ | \\ R - CH - CH - R' \\ | \\ NO_2 \end{array}$$

where R and R' are as heretofore defined. The reaction temperature employed is generally between about −40° and 20°C. and the reactant mole ratio of alkene, that is olefin or cycloalkene, to dinitrogen tetroxide to oxygen is between about 1:0.5:1 and 1:1.5:30. It will be appreciated that the nitro and peroxynitrato groups form on either olefinic carbon with the exception when an olefin is employed and the alkene group is terminal, the nitro group attaches itself to the terminal olefinic carbon. Therefore, when R' is other than hydrogen the nitroperoxy and nitroketone intermediates are actually compound mixtures.

To promote the contact of the reactants, the reaction is desirably carried under conditions of agitation in presence of an inert liquid diluent, for example, organic liquids having a boiling point between about 30° to 100°C., such as hexane, heptane, carbon tetrachloride and diethylether.

In a second stage, the nitroalkylperoxy nitrate or nitrocycloalkylperoxy nitrate formed above is contacted with a denitrating agent illustrated by those selected from one or more members of the group consisting of

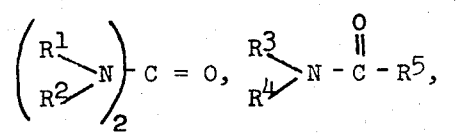

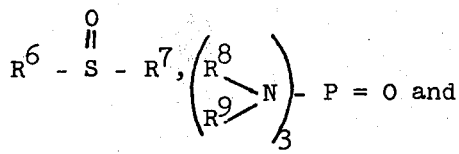

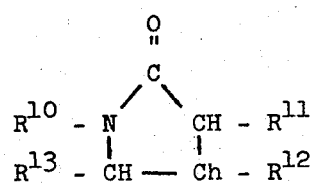

where $R^1$, $R^2$, $R^6$, $R^7$, $R^8$, $R^9$ and $R^{10}$ are alkyl of from 1 to 5 carbons and $R^3$, $R^4$, $R^5$, $R^{11}$, $R^{12}$ and $R^{13}$ are hydrogen or alkyl of from 1 to 5 carbons, such as dimethylformamide, diethylformamide, dimethylacetamide, dimethysulfoxide, diethylsulfoxide, tetramethylurea, tetraethylurea, hexamethylenephosphoramide, 1-methyl-2-pyrrolidinone, 1-ethyl-2-pyrrolidinone, 1-isobutyl-2-pyrrolidinone, 1,3-dimethyl-2-pyrrolidinone, 1,4-dimethyl-2-pyrrolidinone and 1,5-dimethyl-2-pyrrolidinone. The contacting is undertaken under conditions of agitation at a temperature between about −60° and 70°C. in a mole ratio of denitrating agent to peroxy compound of about 1:1 to about 20:1 to form nitroketones of the formula:

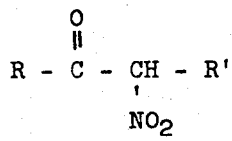

where R and R' are as heretofore defined.

Alternatively, when internal alkenes are employed stages one and two described above may be undertaken simultaneously.

The crude composition resulting from the above nitrooxidation and denitration reactions comprises a mixture of the nitroketone, denitrating agent along with the by-products nitric acid, nitronitrate and nitroalcohol and, if not previously removed, the inert liquid diluent. The nitronitrate and nitroalcohol by-products formed during nitrooxidation and denitration correspond to the formulae:

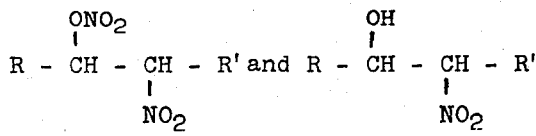

where R and R' are as heretofore defined. It has now been found that separation and recovery of the nitroketone from the crude composition can be effectively carried out so as to provide the nitroketone in purities of at least 95 percent by initially treating the crude nitrooxidized and denitrated composition with ammonia. In this initial stage of separation, the crude composition is contacted with from about 2 to about 10, preferably 2 to 2.5, moles of ammonia per mole of nitroketone at a temperature of about −10° to 30°C. In this stage, the ammonia reacts with nitric acid in the crude composition to form ammonium nitrate and with the nitroketone to yield its ammonium salt. The ammonium salts being insoluble in the crude composition are easily separated therefrom employing any well known technique, for example, by filtration, centrifugation, decantation, etc. The filtrate comprises the denitrating agent and by-products nitronitrates and nitroalcohols each of which are soluble and do not react with ammonia and if not previously removed the inert diluent medium employed in the initial nitrooxidation reaction.

The recovered solids consisting of the ammonium salts of nitric acid and the nitroketone are thereafter contacted with a $C_6$ to $C_{12}$ liquid hydrocarbon at a temperature of from about 35° to 100°C., preferably 50° to 80°C. The hydrocarbon selected is one wherein the ammonium nitrate shows essentially no solubility. Conversely, the nitroketone should be highly soluble in the hydrocarbon so as to permit separation of the ammonium nitrate as, for example, by filtration. Appropriate liquid hydrocarbons include by way of illustration $C_6$ to $C_9$ aromatics such as benzene, toluene, xylenes and trimethylbenzenes; $C_6$ to $C_{12}$ alkanes such as hexane, heptane, decane and dodecane; $C_6$ to $C_{12}$ olefins such as hexenes, methylhexenes and nonenes; and $C_6$ to $C_{12}$ cycloalkanes such as cyclohexane, methylcyclohexane, dimethylcyclohexane, cyclooctane and cyclodecane. Preferred hydrocarbons include benzene, xylenes, heptane and cyclohexane. Contacting of the ammonium salt of the nitroketone in the liquid hydrocarbon at the above temperatures causes decomposition of the ammonium salt of the nitroketone to ammonia and the nitroketone. The ammonia gas can be recovered by sweeping the hydrocarbon solution with nitrogen and removing the ammonia from the effluent gas by use of a low temperature condenser or by water trapping. The recovered ammonia can be recycled for reintroduction to step (a) where continuous processing is contemplated.

While the liquid hydrocarbon mentioned above solublizes the nitroketone derived from the decomposition of the ammonium salt thereof at the temperatures recited, ammonium nitrate remains insoluble under the same conditions. Separation of the ammonium nitrate from the liquid hydrocarbon solution is easily accomplished by any known method whereby solids are removed from liquids, as for example filtration, and a solution of the nitroketone in the hydrocarbon is recovered. The nitroketone can thereafter be separated from the hydrocarbon by reduced pressure distillation of the latter or by crystallization of the nitroketone thereby yielding essentially pure nitroketone.

Specific advantages of the instant invention over the techniques previously employed include the recovery of nitroketone essentially free of contamination from denitrating agent and by-products such as nitronitrates and nitroalcohols. The process is particularly superior to earlier methods where mixtures of olefins, such as $C_6$ to $C_{14}$ olefins, were employed to prepare mixtures of nitroketones. Previously, due to different ranges of melting points and solubilities of the different nitroketones formed, the earlier methods of isolation did not provide the product in high purity. By employing the instant means for separation and recovery, the nitroketones in purities of 95 percent are easily obtained.

A further embodiment of the present method involves the recovery of denitrating agent and inert liquid diluent so as to permit reuse of the same. To recover these components, the filtrate, comprising the denitrating agent and impurities such as nitronitrates and nitroalcohols resulting from denuding the crude composition of the ammonium salts, can be initially distilled at atmospheric pressure to recover, if present and not previously removed, the inert liquid diluent having a boiling point between about 30° to 100°C. employed in the nitrooxidation reaction. The resulting diluent denuded composition is then distilled at a temperature of 70° to 270°C. and at a pressure of 5 to 760 mm/Hg so as to recover the denitrating agent. The diluent and denitrating agent can suitably be recycled for reintroduction to the nitrooxidation and denitrating stages respectively. The residue comprising nitronitrates and nitroalcohols can thereafter be separated by distillation or by means of chromatography over silica gel depending on the molecular weight of the nitronitrates and nitroalcohols. These materials are useful in preparing amines and acids. The high purity nitroketones provided by the instant process are highly desirable and find application as fuel and lubricant additives, and as intermediates in the preparation of amides, amines, acids and nitroalkanes.

In order to more fully illustrate the nature of our invention and the manner of practicing the same the following examples are presented.

EXAMPLE I

Into a 300 milliliter flask equipped with a gas inlet, thermometer and condenser, there was charged 7.0 grams (0.031 mole) or 1-hexadecene and 100 milliliters of carbon tetrachloride. To this solution maintained at a temperature of 5° to 10°C. there was introduced oxygen at the rate of 70 milliliters per minute and 2.9 grams (0.031 mole) of dinitrogen tetroxide at the rate of 0.05 gram per minute over a period of one hour. At the end of the dinitrogen tetroxide-oxygen addition period, 6.0 grams (0.062 mole) of 1-methyl-2-pyrrolidinone as denitrating agent were added over a period of one-half hour while maintaining the temperature at 5° to 10°C.

To the above crude composition, maintained at 5° to 10°C., there was introduced 1.06 gram (0.062 mole) of ammonia as a gas at the rate of 0.070 grams per minute over a period of one-quarter hour. The solid, composed of ammonium nitrate and the ammonium salt of 1-nitro-2-hexadecanone were separated from the crude composition by filtration and weighted 11.8 grams. 100 milliliters of benzene were added to the ammonium salts and the mixture was heated to a reflux temperature of 80°C., for a period of 1 hour and thereafter filtered. 3.4 grams, 95 percent yield, of ammonium nitrate were recovered. The hydrocarbon solution was stripped of benzene by distillation at 30°C. and 30 mm pressure and the residue consisted of 8.0 grams of 1-nitro-2-hexadecanone corresponding to a yield of 91 percent in a purity of 98 percent.

The ammonium salt denuded filtrate was distilled at 77°C. under 760 mm/Hg pressure to 90°C. under 15 mm/Hg pressure and 95 milliliters of carbon tetrachloride corresponding to a recovery of 95 percent was obtained along with 5.58 grams of 1-methyl-2-pyrrolidinone corresponding to a 93 percent recovery. The residue weighing 1.29 grams consisted of a mixture of nitronitrate, nitroalcohol and nitroketone. In continuous processing the carbon tetrachloride recovered can be recycled for reintroduction to the nitrooxidation stage, 1-methyl-2-pyrrolidinone recycled to the denitrating stage, ammonia recycled to the initial separation step (a) and benzene to separation step (c). The residue can optionally be recycled to the crude composition in step (a) so as to recover additional nitroketone.

EXAMPLE II

Using the procedure described in Example I, decene-1 (7.0 grams, 0.05 mole) in 75 milliliters of carbon tetrachloride was treated with dinitrogen tetroxide (4.6 grams, 0.05 mole) and oxygen. After subsequent addition of dimethylformamide (5.5 grams, 0.075 mole), the resulting solution was cooled to 0° to 5°C. and contacted with ammonia (2.3 grams, 0.13 mole) over a period of 10 minutes. The resulting precipitate (13.1 grams) of mixed ammonium nitrate and nitroketone-ammonia salt was collected by filtration. The mixed salts were added to 100 milliliters of benzene and the mixture refluxed for 15 minutes. After filtering to remove the insoluble ammonium nitrate (3.8 grams, 95 percent yield), the benzene filtrate was stripped under reduced pressure of 30 mm/Hg to leave a crystalline residue of 1-nitro-2-decanone (8.45 grams, 84 percent yield, calculated purity 98 percent).

The ammonium salt denuded filtrate was distilled at reduced pressures of 50 to 100 mm/Hg and there was recovered 69.5 milliliters (92 percent) of carbon tetrachloride and 5.0 grams (91 percent) of dimethylformamide.

EXAMPLE III

Cyclododecene (16.6 grams, 0.10 mole) and 200 milliliters of dry benzene were charged to a 500 milliliter flask equipped with a gas inlet, thermometer, stirrer and condenser. The solution was cooled to 5°C. and a mixture of dinitrogen tetroxide (9.2 grams, 0.10 mole) and oxygen in a volume to volume ratio of 1:4 were introduced over a period of 2.5 hours with rapid stirring. Upon complete addition of the dinitrogen tetroxide, dimethylformamide (11 grams, 0.150 mole) was added while maintaining the reaction temperature at about 5°C. The mixture at the above temperature was treated with gaseous ammonia (2.5 grams, 0.150 mole) and the resulting precipitate (27.6 grams) of mixed ammonium nitrate and the ammonium salt of 2-nitrocyclododecanone was collected by filtration.

The mixed ammonium salts were added to 100 milliliters of benzene and the mixture heated to reflux for 20 minutes. After filtering to remove the insoluble ammonium nitrate (7.6 grams, 95 percent yield), the filtrate was stripped under reduced pressure leaving a crystalline residue of 2-nitrocyclododecanone (19.0 grams, 83 percent yield, greater than 95 percent purity).

We claim:

1. A process for the separation and recovery of a nitroketone from a crude composition obtained from the nitro-oxidation of an alkene or cycloalkene using dinitrogen tetroxide, oxygen and a denitrating agent and containing said nitroketone and nitric acid, denitrating agent, nitronitrate and nitroalcohol which comprises;
   a. treating said crude composition with from about 2 to 10 moles of ammonia per mole of nitroketone at a temperature of from about $-10°$ to $30°C$. thereby forming an ammonium salt of said nitroketone and ammonium nitrate insoluble in said crude composition,
   b. separating the ammonium salt of said nitroketone and ammonium nitrate from (a),
   c. contacting the ammonium salt of said nitroketone and ammonium nitrate with a $C_6$ to $C_{12}$ liquid hydrocarbon at a temperature of from about $35°$ to $100°C$. and separating insoluble ammonium nitrate and ammonia vapors from said liquid hydrocarbon, and
   d. separating said nitroketone from said hydrocarbon of (c).

2. A process according to claim 1 wherein step (a) is conducted at a temperature of from $0°$ to $10°C$.

3. A process according to claim 1 wherein 2.0 to 2.5 moles of ammonia per mole of nitroketone are employed.

4. A process according to claim 1 wherein said contacting in step (c) is conducted at a temperature of from $50°$ to $80°C$.

5. A process according to claim 1 wherein said liquid hydrocarbon in step (c) has from 6 to 12 carbon atoms.

6. A process according to claim 1 wherein said liquid hydrocarbon in step (c) is selected from group consisting of benzene, toluene, xylene, heptane and cyclohexane.

7. A process according to claim 1 wherein ammonia is separated and recovered from step (c).

8. A process according to claim 1 wherein said hydrocarbon in step (d) is recycled to step (c).

9. A process according to claim 1 wherein an ammonium salt denuded filtrate is recovered from step (b), distilling said filtrate at a temperature of from $70°$ to $270°C$. and at a pressure of 5 to 760 mm/Hg and recovering said denitrating agent.

10. A process according to claim 9 wherein said distilled filtrate comprising nitroketone, nitronitrate and nitroalcohol is recycled to step (a).

11. A process according to claim 1 wherein said nitroketone corresponds to the formula:

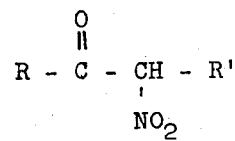

where R is an alkyl group having from 1 to 20 carbon atoms or an aryl group having from 6 to 20 carbon atoms, where R' is hydrogen, an alkyl group having from 1 to 20 carbon atoms or an aryl group having from 6 to 20 carbon atoms or where R and R' together form a polymethylene group of from 1 to 20 carbon atoms.

12. A process according to claim 11 where R and R' together form a polymethylene group of from 4 to 20 carbon atoms.

13. A process according to claim 1 wherein said nitronitrate and nitroalcohol correspond respectively to the formulae:

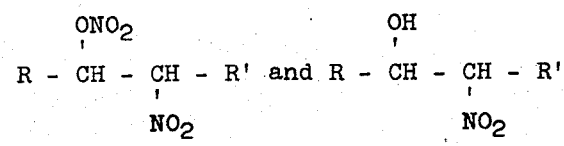

where R and R' are as defined in claim 11.

14. A process according to claim 1 wherein said denitrating agent is selected from the group

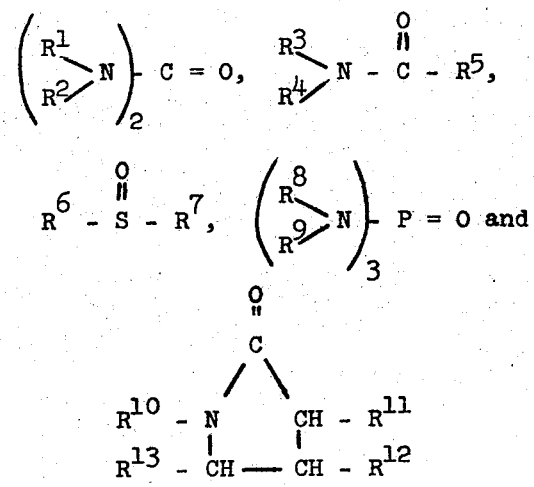

where $R^1$, $R^2$, $R^6$, $R^7$, $R^8$, $R^9$ and $R^{10}$ are alkyl of from 1 to 5 carbons and $R^3$, $R^4$, $R^5$, $R^{11}$, $R^{12}$ and $R^{13}$ are hydrogen or alkyl of from 1 to 5 carbons.

* * * * *